US006679452B1

(12) United States Patent
Cottet et al.

(10) Patent No.: US 6,679,452 B1
(45) Date of Patent: Jan. 20, 2004

(54) AIRCRAFT LANDING GEAR SUPPORT ASSEMBLIES AND ASSOCIATED METHODS OF INSTALLATION

(75) Inventors: Justin D. Cottet, Snohomish, WA (US); Michael J. Meneghetti, Marysville, WA (US); Brett D. Whitmer, Everett, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/278,633

(22) Filed: Oct. 22, 2002

Related U.S. Application Data
(60) Provisional application No. 60/417,885, filed on Oct. 10, 2002.

(51) Int. Cl.[7] ............................................... B64C 25/10
(52) U.S. Cl. ...................................................... 244/102 R
(58) Field of Search ........................ 244/100 R, 102 R, 244/102 A, 102 SL, 102 SS, 54

(56) References Cited

U.S. PATENT DOCUMENTS

| | | | | |
|---|---|---|---|---|
| 2,750,134 A | * | 6/1956 | Hawkins, Jr. et al. | 244/102 R |
| 4,087,062 A | * | 5/1978 | Masclet | 244/102 R |
| 4,155,522 A | * | 5/1979 | Sealy | 244/102 R |
| 4,345,727 A | * | 8/1982 | Brown et al. | 244/102 R |
| 4,392,622 A | * | 7/1983 | McClaflin | 244/102 R |
| 4,392,623 A | * | 7/1983 | Munsen et al. | 244/102 R |
| 6,318,669 B1 | * | 11/2001 | Dazet et al. | 244/102 R |

OTHER PUBLICATIONS

Composite Wing Box—Testing, Testing of a McDonnell Douglas Composite Wing Box Landing Gear Attachment, ©2000 (3 pages) http://www.structures.ucsd.edu/casl/projects/wing_box/testing.htm [Accessed Jul. 24, 2002].
A340 Wing, Main Landing Gear Pick Up Structure, Feb. 1990.

* cited by examiner

*Primary Examiner*—Galen L Barefoot
(74) *Attorney, Agent, or Firm*—Perkins Coie LLP

(57) ABSTRACT

Landing gear support assemblies and associated methods of installation. In one embodiment, a landing gear support assembly usable with an aircraft wing includes an aft trunnion support beam having a base portion, an aft trunnion support spaced apart from the base portion, and a shear center axis extending from the base portion toward the aft trunnion support. The aft trunnion support can be at least approximately vertically aligned with the shear center axis. The base portion can be configured to be attached at least proximate to the rear wing spar with a plurality of fuse pins configured to fail and release the aft trunnion support beam from the rear wing spar when the landing gear exerts a preselected force against the aft trunnion support.

38 Claims, 5 Drawing Sheets

AIRCRAFT LANDING GEAR SUPPORT ASSEMBLIES AND ASSOCIATED METHODS OF INSTALLATION

CROSS-REFERENCE TO RELATED APPLICATION

This application claims the benefit of pending U.S. Provisional Patent Application No. 60/417,885, filed on Oct. 10, 2002, and which is incorporated herein in its entirety by reference.

TECHNICAL FIELD

The following disclosure relates generally to aircraft landing gears and, more particularly, to aircraft landing gear support assemblies for use with aircraft wings.

BACKGROUND

Many aircraft have retractable landing gears attached to their wings. These landing gears are generally movable between a static deployed position for supporting the aircraft on the ground and a static retracted position for reducing aerodynamic drag during flight. Because of high landing loads, these landing gears are typically attached to the wings with a very strong support assembly. In addition to being very strong, this support assembly must also accommodate movement of the landing gear between the static deployed and static retracted positions.

Figure 1:
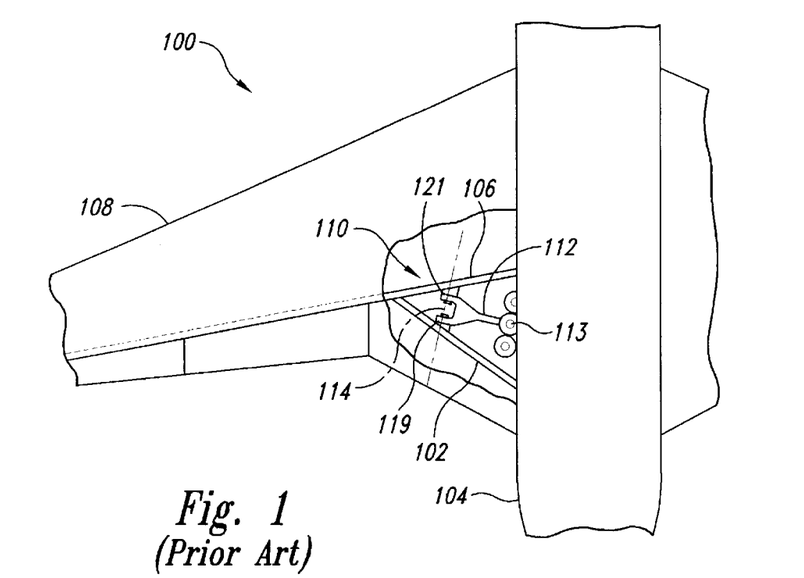
FIG. 1 is a partial cutaway top view of an aircraft having a landing gear support assembly configured in accordance with the prior art.

FIG. 1 is a partial cutaway top view of an aircraft 100 having a retractable landing gear 112 attached to a wing 108 in accordance with the prior art. The landing gear 112, which is depicted in FIG. 1 in a static retracted position for flight, can pivot downwardly and outwardly about an axis 114 to position a wheel truck 113 for landing. The landing gear 112 is attached to the wing 108 with a landing gear support assembly 110 that includes a forward trunnion support 121 and an aft trunnion support 119. The forward trunnion support 121 is attached to a rear wing spar 106, and the aft trunnion support 119 is attached to a beam 102 extending between the rear wing spar 106 and a fuselage 104. Accordingly, landing loads from the landing gear 112 are transferred to the rear wing spar 106 via the forward trunnion support 121, and to the rear wing spar 106 and the fuselage 104 via the aft trunnion support 119 and the beam 102.

One downside associated with the landing gear support assembly 110 is that the beam 102 must be relatively large, and hence relatively heavy, to transfer the high landing loads from the aft trunnion support 119 to the rear wing spar 106 and the fuselage 104. This additional weight can adversely affect aircraft performance.

Figure 2:
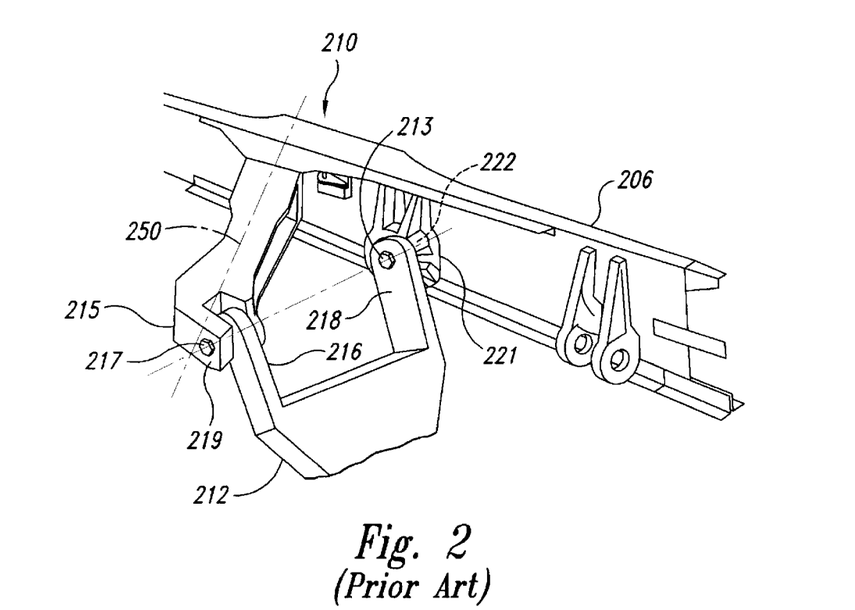
FIG. 2 is a top isometric view of another landing gear support assembly configured in accordance with the prior art.

FIG. 2 is a top isometric view of another landing gear support assembly 210 configured in accordance with the prior art. FIG. 2 is taken from a perspective looking outboard and slightly forward relative to a rear wing spar 206. The landing gear support assembly 210 includes a forward trunnion support 221 attached to the rear wing spar 206, and a landing gear aft trunnion support beam 215 attached to the rear wing spar 206 outboard of the forward trunnion support 221. The forward trunnion support 221 includes a spherical bearing 222 configured to receive a pin 213 to pivotally support a forward pivot portion 218 of a landing gear main strut 212. The landing gear aft trunnion support beam 215 is at least partially cantilevered from the rear wing spar 206, and includes an aft trunnion support 219. The aft trunnion support 219 is laterally offset from a longitudinal axis 250 of the aft trunnion support beam 215, and is configured to receive a fuse pin 217 to pivotally support an aft pivot portion 216 of the landing gear main strut 212. The term "fuse pin" is used herein to denote a cylindrical pin that has been designed to fail under a preselected force.

As best understood by the applicants, the lateral offset between the aft trunnion support 219 and the longitudinal axis 250, in combination with the fuse pin 217 and the spherical bearing 222, enables the landing gear main strut 212 to break free of the aft trunnion support beam 215 and the rear wing spar 206 in the event of an overload condition. As used herein, an "overload" or "overload condition" is defined as a design load condition at which a landing gear support is designed to fail. Breaking free of the aft trunnion support beam 215 and the rear wing spar 206 in this manner apparently prevents the landing gear main strut 212 from causing damage to the rear wing spar 206. This failure mode is desirable because many aircraft carry fuel in their wings directly forward of the rear wing spar and adjacent to the landing gear. Thus, rupturing the rear wing spar in such aircraft could potentially cause a substantial fuel leak.

One shortcoming associated with the landing gear support assembly 210 is that the lateral offset between the aft trunnion support 219 and the longitudinal axis 250 causes the landing gear main strut 212 to put a significant torsional load into the aft trunnion support beam 215 about the longitudinal axis 250 when vertically loaded. As a result, the aft trunnion support beam 215 must be relatively large, and hence relatively heavy, to carry this torsional load without failure. As mentioned above with reference to FIG. 1, this additional weight can adversely affect aircraft performance.

SUMMARY

Aspects of the invention are directed to landing gear support assemblies for attaching landing gears to aircraft wings. In one aspect, an aft trunnion support beam for use with an aircraft landing gear support assembly includes a base portion and an aft trunnion support spaced apart from the base portion. The base portion can be configured to be attached at least proximate to a rear wing spar. The aft trunnion support can be configured to pivotally support at least a portion of a landing gear main strut. The aft trunnion support beam can further include a shear center axis extending from the base portion toward the aft trunnion support. The shear center axis can be at least approximately vertically aligned with the aft trunnion support.

In another aspect of the invention, the base portion of the aft trunnion support beam can be attached to the rear wing spar with at least a first breakable element, such as a fuse pin. The first breakable element can be configured to break and release the aft trunnion support beam from the wing spar when the landing gear main strut exerts a preselected force against the aft trunnion support.

In a further aspect of the invention, a method for mounting a landing gear to an aircraft wing includes attaching a forward trunnion support at least proximate to a rear wing spar, and attaching a base portion of an aft trunnion support beam at least proximate to the rear wing spar. The aft trunnion support beam can further include an aft trunnion support spaced apart from the base portion and a shear center axis extending from the base portion toward the aft trunnion support. The shear center axis can be at least approximately vertically aligned with the aft trunnion support. The method can further include pivotally connecting a forward pivot portion of the landing gear main strut to the forward trunnion support and pivotally connecting an aft pivot portion of the landing gear main strut to the aft trunnion support.

DETAILED DESCRIPTION

The following disclosure describes aircraft landing gear support assemblies and associated methods for attaching aircraft landing gears to wings. Certain specific details are set forth in the following description and in FIGS. 3–6 to provide a thorough understanding of various embodiments of the invention. Those of ordinary skill in the relevant art will understand, however, that they can practice other embodiments of the invention without several of the details described below. Certain specific details of well-known structures and systems often associated with aircraft are not set forth in the following disclosure to avoid unnecessarily obscuring the various embodiments of the invention. Any dimensions, angles, or other specifications shown in the following figures are merely illustrative of particular embodiments of the invention. Accordingly, other embodiments of the invention can have other dimensions, angles, and specifications without departing from the spirit or scope of the present invention.

In the drawings, identical reference numbers identify identical or at least generally similar elements. To facilitate the discussion of any particular element, the most significant digit or digits of any reference number refer to the figure in which that element is first introduced. For example, element 330 is first introduced and discussed with reference to FIG. 3.

Figure 3:
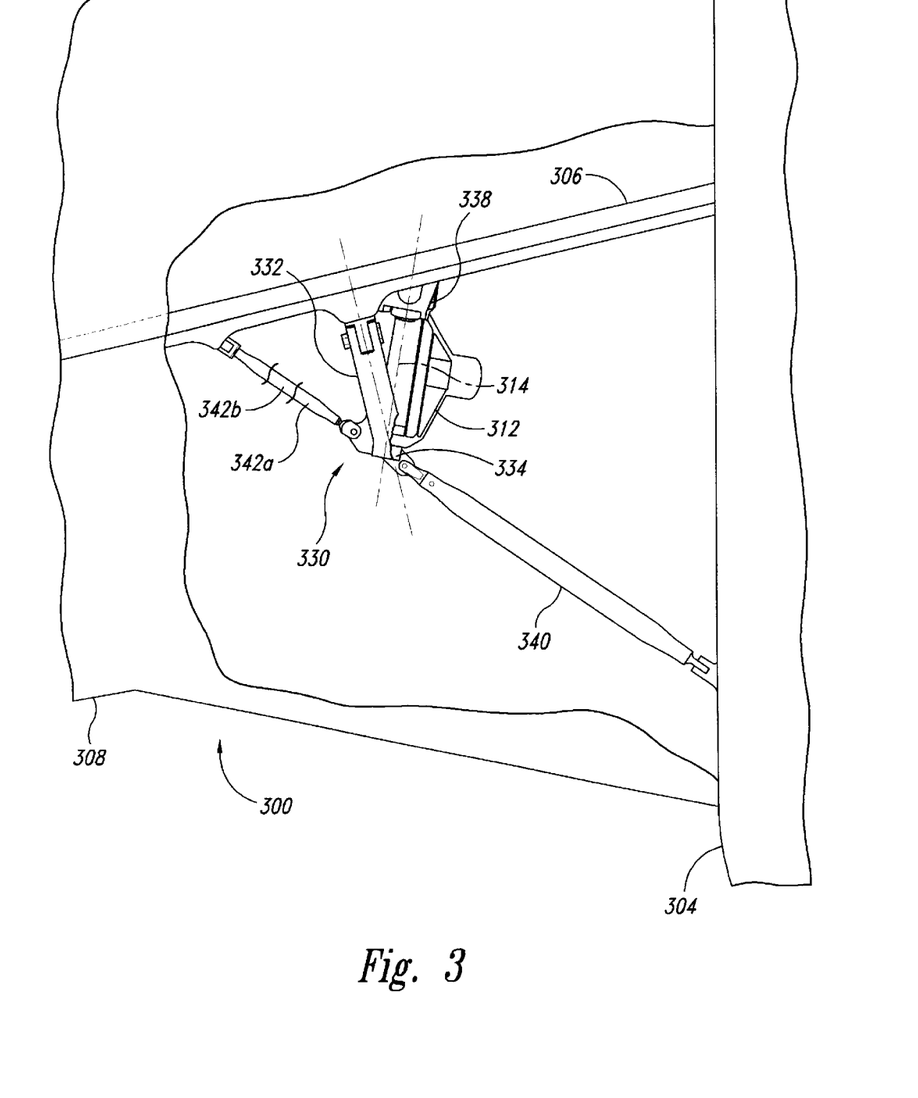
FIG. 3 is a cutaway top view of a portion of an aircraft having a landing gear support assembly configured in accordance with an embodiment of the invention.

FIG. 3 is a cutaway top view of a portion of an aircraft 300 having a landing gear support assembly 330 configured in accordance with an embodiment of the invention. In one aspect of this embodiment, the aircraft 300 includes a wing 308 extending outwardly from a fuselage 304. The landing gear support assembly 330 can include a forward trunnion support 338 fixedly attached to a rear wing spar 306, and an aft trunnion support beam 332 attached at least proximate to the rear wing spar 306 outboard of the forward trunnion support 338. The aft trunnion support beam 332 extends at least generally aft from the rear wing spar 306 and includes an aft trunnion support 334 axially aligned with the forward trunnion support 338 along an axis 314. In another embodiment, the aft trunnion support beam 332 can be attached to the rear wing spar 306 inboard of the forward trunnion support 338. In a further embodiment, the forward trunnion support 338 can be fixedly attached at least proximate to the aft trunnion support beam 332. In yet another embodiment, the forward trunnion support 338 can be fixedly attached directly to the aft trunnion support beam 332.

As will be explained in greater detail below, a landing gear main strut 312 (or "main strut 312") can be pivotally attached to the forward trunnion support 338 and the aft trunnion support 334 for pivotal motion about the axis 314 between a static deployed position as shown in FIG. 3 and a static retracted position (folded inward toward the fuselage 304). The well-known structures and systems often used to pivotally move landing gear main struts between the static deployed and static retracted positions are not shown in FIG. 3 for purposes of clarity. In the static deployed position, the main strut 312 can position a wheel truck (not shown) below the wing 308 to support the aircraft 300 on the ground. Once airborne, the main strut 312 can be retracted inwardly about the axis 314 to stow the wheel truck within the wing 308 for flight. In other embodiments, the main strut can be retracted in other directions and stowed in other portions of the aircraft 300. For example, in another embodiment, the main strut 312 can be retracted forwardly and stowed in the wing 308. In a further embodiment, the main strut 312 can be retracted inwardly and stowed at least partially in the fuselage 304.

In another aspect of this embodiment, the landing gear support assembly 330 includes an inboard lateral support strut 340 and outboard lateral support struts 342 (shown in FIG. 3 as a first outboard lateral support strut 342a and a second outboard lateral support strut 342b). The outboard lateral support struts 342 can extend from the rear wing spar 306 to at least proximate the aft trunnion support 334. The inboard lateral support strut 340 can similarly extend from the fuselage 304 to at least proximate the aft trunnion support 334.

In a further aspect of this embodiment, the inboard lateral support strut 340 and the outboard lateral support struts 342 can transfer side loads from the main strut 312 to the fuselage 304 and the rear wing spar 306, respectively. The aft trunnion support beam 332 can transfer vertical loads from the main strut 312 into the rear wing spar 306. In other embodiments, other structural arrangements can be used to transfer loads from the main strut 312 into the wing 308 and/or the fuselage 304. For example, in another embodiment, the inboard lateral support strut 340 can be omitted and the outboard lateral support struts 342 can transfer the side loads from the main strut 312 to the rear wing spar 306. In yet another embodiment, the outboard lateral support struts 342 can be omitted and the inboard lateral support strut 340 can transfer the side loads from the main strut 312 to the fuselage 304.

Figure 4:
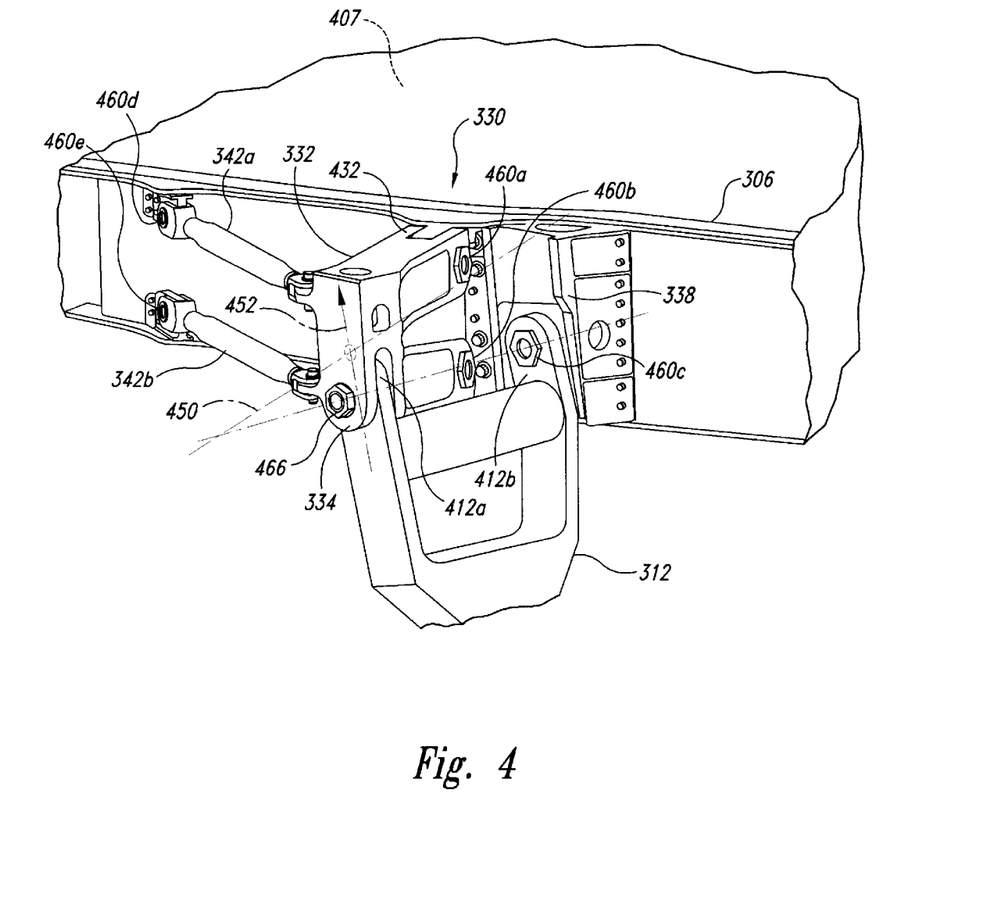
FIG. 4 is an enlarged top rear isometric view of the landing gear support assembly of FIG. 3.

FIG. 4 is an enlarged top rear isometric view of the landing gear support assembly 330 of FIG. 3. The inboard lateral support strut 340 (FIG. 3) has been removed for purposes of clarity. In one aspect of this embodiment, the aft trunnion support beam 332 includes a base portion 432 configured to be attached at least proximate to the rear wing spar 306, and a shear center axis 450 extending from the base portion 432 toward the aft trunnion support 334. The term "shear center axis" is used herein to describe an axis of the aft trunnion support beam 332 through which external forces can act without introducing torsional loads into the aft trunnion support beam 332. That is, external forces having lines of action that intersect the shear center axis 450 can only result in displacement of the aft trunnion support beam 332 and not twisting.

In another aspect of this embodiment, the aft trunnion support 334 is spaced apart from the base portion 432 and is configured to receive a pin 466 to pivotally support an aft pivot portion 412a of the main strut 312. When the main strut 312 is in the static deployed position as shown in FIG. 4, the aft pivot portion 412a predominately exerts a resultant force against the aft trunnion support 334 along a line of action 452. The aft trunnion support 334 and the shear center axis 450 can be at least approximately aligned with the line of action 452. As a result, when the aft pivot portion 412a of the main strut 312 exerts a resultant force against the aft trunnion support 334 along the line of action 452, the line of action 452 will at least approximately intersect the shear center axis 450. As will be explained in greater detail below, reducing or eliminating any offset between the line of action 452 and the shear center axis 450 can reduce or eliminate the torsional loads on the aft trunnion support beam 332. This reduction of torsional loads allows a corresponding reduction in the size and weight of the aft trunnion beam 332.

In the illustrated embodiment, aligning the shear center axis 450 and the aft trunnion support 334 with the line of action 452 results in the aft trunnion support 334 being at least approximately vertically aligned with the shear center axis 450. In other embodiments, maintaining this alignment may cause the aft trunnion support 334 to be laterally offset relative to the shear center axis 450 depending on the angle of the main strut 312 in the deployed static position.

In a further aspect of this embodiment, the base portion 432 is attached to the rear wing spar 306 with a first fuse pin 460a and a second fuse pin 460b that are positioned in vertical alignment with each other. In other embodiments, the fuse pins 460 can be positioned in different arrangements. For example, in other embodiments, the fuse pins 460 can be diagonally or laterally offset with respect to each other. In yet another aspect of this embodiment, a forward pivot portion 412b of the main strut 312 is pivotally attached to the forward trunnion support 338 with a third fuse pin 460c, and the outboard lateral support struts 342a and 342b are attached to the rear wing spar 306 with a fourth fuse pin 460d and a fifth fuse pin 460e, respectively. Accordingly, when the main strut 312 exerts a preselected force, such as an overload, against the aft trunnion support 334 along the line of action 452, the resulting bending load on the aft trunnion support beam 332 causes the fuse pins 460a and 460b, and subsequently the fuse pins 460c-e, to break and release the aft trunnion support beam 332, the main strut 312, and the outboard lateral support struts 342 from the rear wing spar 306. Releasing these components from the rear wing spar 306 in this manner prevents them from rupturing the rear wing spar 306 and causing a leak in a fuel tank 407 positioned on the opposite side of the rear wing spar 306 adjacent to the landing gear support assembly 330.

In other embodiments, other features can be used to provide the landing gear support assembly 330 with the break-away capability described above. For example, in another embodiment, high-strength bolts or pins (e.g., not fuse pins) can be used to attach the aft trunnion support beam 332 and the other components of the landing gear support assembly 330 to the rear wing spar 306. In this embodiment, a portion of the aft trunnion support beam 332, and similar portions of the other components, can be undersized or otherwise configured to break in the event the aft trunnion support beam 332 experiences an excessive landing force.

One feature of embodiments of the invention shown in FIG. 4 is that the aft trunnion support 334 is positioned to cause the line of action 452 to at least approximately intersect the shear center axis 450 when the main strut 312 is in the static deployed position. An advantage of this feature is that the aft trunnion support beam 332, unlike the prior art support beam 215 shown in FIG. 2, does not have to be sized to carry significant torsional loads, and accordingly, its weight can be reduced. Another feature of embodiments of the invention shown in FIG. 4 is that the placement of the fuse pins 460a-e allows the aft trunnion support 334 to be positioned at least approximately beneath the aft trunnion support beam 332 while still providing the landing gear support assembly 330 with the break-away capability described above. An advantage of this feature is that a potentially catastrophic landing event will not likely be further compounded by a ruptured fuel tank.

Figure 5:
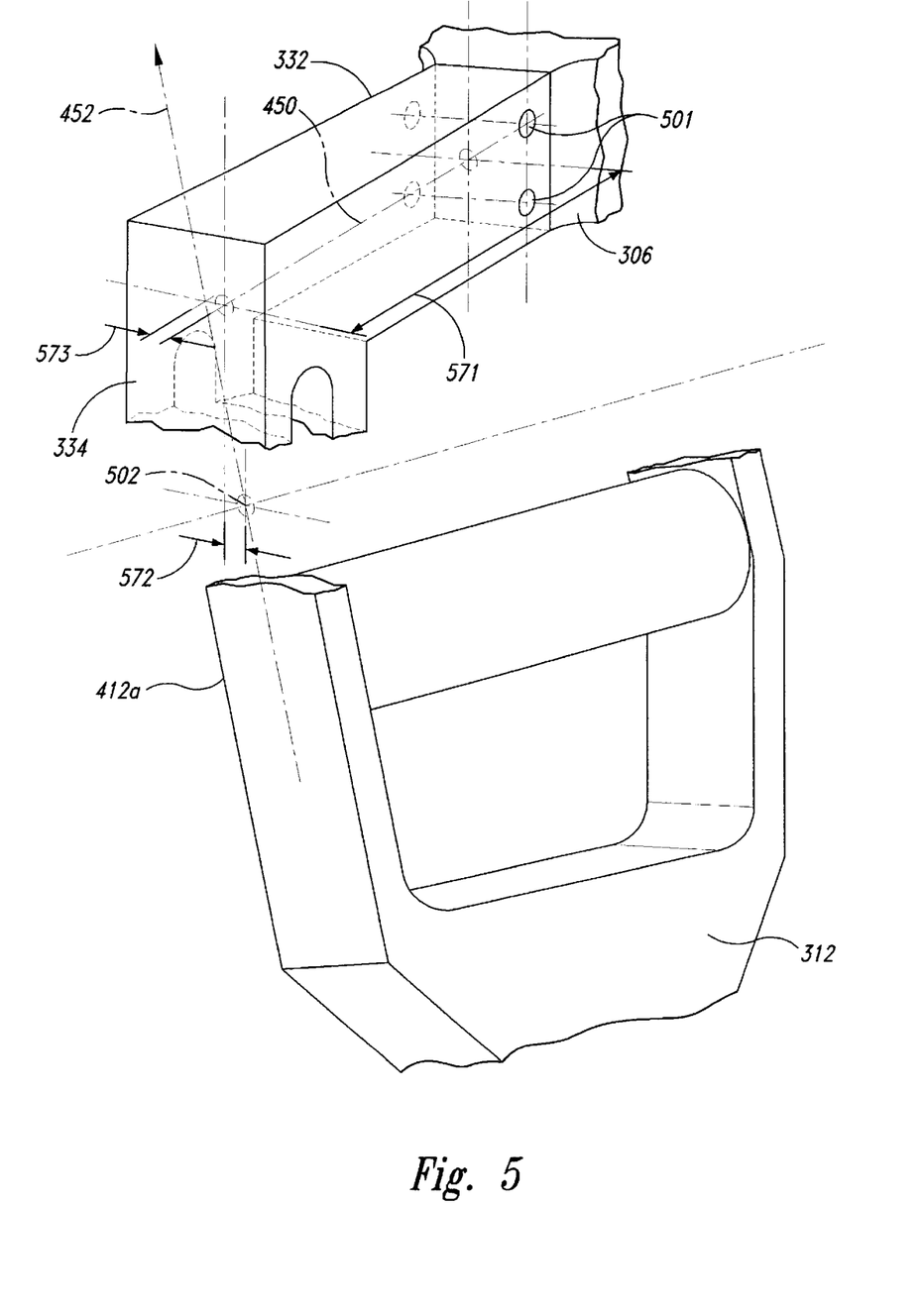
FIG. 5 is an enlarged isometric schematic diagram illustrating geometric relationships that can exist between the main strut and the aft trunnion support beam of FIG. 4 when they are configured in accordance with an embodiment of the invention.

FIG. 5 is an enlarged isometric schematic diagram illustrating geometric relationships that can exist between the main strut 312 and the aft trunnion support beam 332 when they are configured in accordance with an embodiment of the invention. In one aspect of this embodiment, the fuse pins 460a and 460b (FIG. 4) attach the aft trunnion support beam 332 to the rear wing spar 306 at a first location 501. In another aspect of this embodiment, the aft trunnion support 334 can pivotally support the aft pivot portion 412a of the main strut 312 at a second location 502. The second location 502 can be longitudinally spaced apart from the first location 501 by a first distance 571, and can be laterally offset from the shear center axis 450 by a second distance 572. The second distance 572 can be selected to control a lateral third distance 573 between the shear center axis 450 and the line of action 452.

In a further aspect of this embodiment, the second distance 572 is selected to reduce the ratio of the third distance 573 divided by the first distance 571. Reducing this ratio can accordingly reduce the torsional load applied to the aft trunnion support beam 332 by the aft pivot portion 412a of the main strut 312. For example, in one embodiment, the second distance 572 is selected to produce a ratio equal to or less than about 0.10. In another embodiment, the second distance 572 is selected to produce a ratio equal to or less than about 0.07. In yet another embodiment, the second distance 572 is selected to produce a ratio equal to or less than about 0.05. In still another embodiment, the second distance 572 is selected to produce a ratio equal to about 0.

In all of the embodiments described above with reference to FIG. 5, the second location 502 can be at least approximately vertically aligned with the shear center axis 450. For example, in one embodiment, the second distance 572 can be equal to or less than about 2.5 inches. In another embodiment, the second distance 572 can be equal to or less than about 1.5 inches. In a further embodiment, the second distance 572 can be equal to or less than about 1.0 inch. In yet another embodiment, the second distance 572 can be equal to about 0 inch. In still other embodiments, the second distance 572 can have other values depending on factors such as the angle of the main strut 312 in the static deployed position, and the vertical distance between the second location 502 and the shear center axis 450. For example, if the main strut 312 is positioned at least approximately vertically in the static deployed position, then the second distance 572 can be at least approximately equal to 0 inch.

Figure 6:
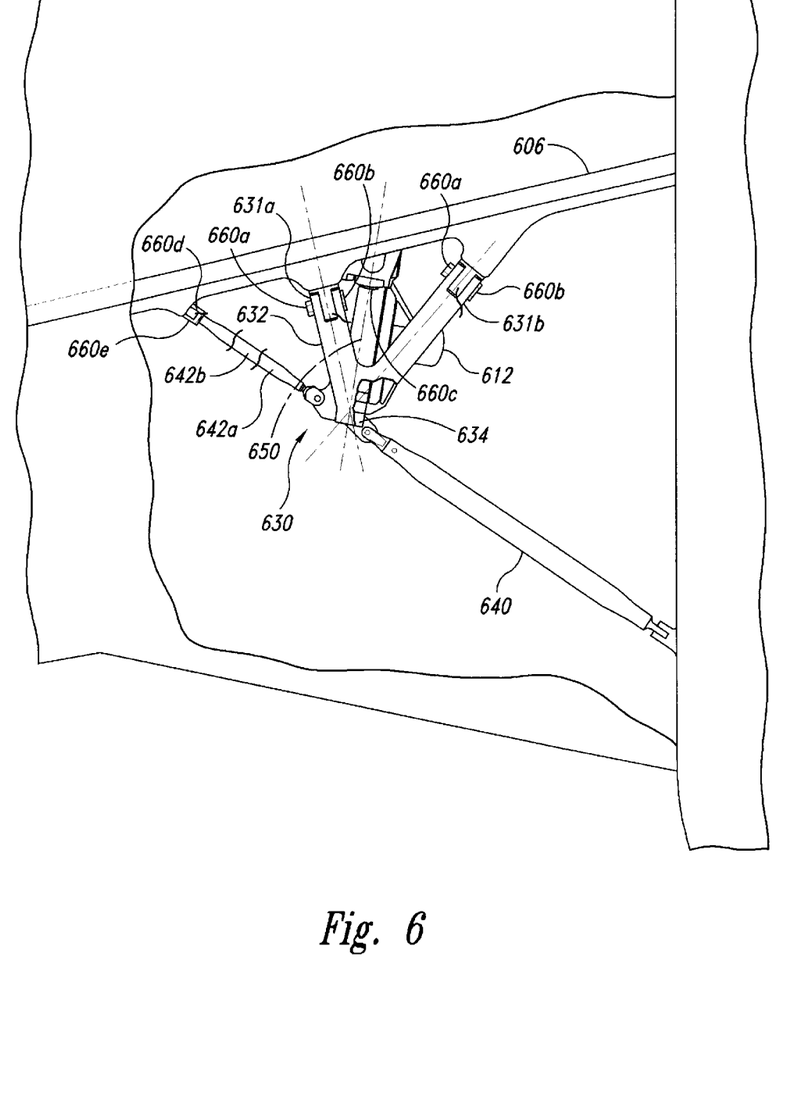
FIG. 6 is a top view of a landing gear support assembly configured in accordance with another embodiment of the invention.

FIG. 6 is a top view of a landing gear support assembly 630 configured in accordance with another embodiment of the invention. In one aspect of this embodiment, an aft trunnion support beam 632 includes a first leg 631a and a second leg 631b configured to be attached to a rear wing spar 606 at separate locations. The legs 631 are joined together toward an aft trunnion support 634 that pivotally supports at least a portion of a landing gear main strut 612. The aft trunnion support beam 632 can further include a shear center axis 650 extending at least generally between the first leg 631a and the second leg 631b. Accordingly, the shear center axis 650 and the aft trunnion support 634 can be at least approximately vertically aligned with each other to efficiently transfer landing loads from the main strut 612 to the rear wing spar 606.

In another aspect of this embodiment, the landing gear support assembly 630 can include an inboard lateral support strut 640 and outboard lateral support struts 642 that are at least generally similar in structure and function to their counterparts discussed above with reference to FIGS. 3 and 4. Because of the inherent lateral strength offered by the spaced-apart legs 631, however, in other embodiments one or more of the outboard lateral support struts 642, or the inboard lateral support strut 640, can be omitted. The landing gear support assembly 630 can also include a plurality of fuse pins 660a–e, or similar elements, attaching the aft trunnion support beam 632 and the other support assembly components to the rear wing spar 606. Accordingly, the fuse pins 660a–e enable the landing gear support assembly 630 to release from the rear wing spar 606 in the event the main strut 612 exerts a preselected force, such as an overload, against the aft trunnion support 634.

As the discussion above demonstrates, landing gear support assemblies in accordance with this disclosure can include more, fewer and/or other structural elements in other embodiments without departing from the spirit or scope of the present invention. In addition, although the foregoing disclosure describes landing gear support assemblies in the general context of wing-mounted landing gears for purposes of illustration, in other embodiments, aspects of these arrangements are equally applicable to other landing gear systems, such as fuselage-mounted landing gear systems. Further, landing gear support assemblies in accordance with the present invention can be positioned at locations on aircraft wings other than those locations described above with reference to FIGS. 3–6. For example, in another embodiment, a landing gear support assembly configured in accordance with the present invention can be attached at least proximate to a forward wing spar.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An apparatus for attaching a landing gear to an aircraft wing, the landing gear having a main strut and the aircraft wing having a wing spar, the apparatus comprising:
    a trunnion support beam having:
        a base portion configured to be attached at least proximate to the wing spar;
        a trunnion support spaced apart from the base portion and configured to pivotally support at least a portion of the landing gear main strut; and
        a shear center axis extending from the base portion toward the trunnion support, wherein the trunnion support is configured to be at least approximately vertically aligned with the shear center axis when the base portion is attached at least proximate to the wing spar.

2. The apparatus of claim 1 wherein the base portion is attached to the wing spar with at least a first fuse pin configured to fail and release the trunnion support beam from the wing spar when the landing gear main strut exerts a preselected force against the trunnion support.

3. The apparatus of claim 1 wherein the base portion is configured to release the trunnion support beam from the wing spar when the landing gear main strut exerts a preselected force against the trunnion support.

4. The apparatus of claim 1, further comprising a lateral support attach point configured to receive a lateral support strut extending from the wing spar to a position at least proximate to the trunnion support beam.

5. The apparatus of claim 1, further comprising a lateral support attach point configured to receive a lateral support strut extending from a fuselage portion to a position at least proximate to the trunnion support beam.

6. The apparatus of claim 1 wherein the landing gear main strut is pivotable relative to the trunnion support between a static retracted position and a static deployed position, the landing gear main strut exerting a resultant force against the trunnion support along a line of action when the landing gear main strut is in the static deployed position, and wherein the line of action at least approximately intersects the shear center axis.

7. The apparatus of claim 1, further comprising first and second legs spaced apart from each other relative to the wing spar, wherein the first and second legs are joined together toward the trunnion support.

8. The apparatus of claim 1 wherein the wing spar is a rear wing spar, and wherein the trunnion support beam is configured to extend at least generally aft of the rear wing spar.

9. An apparatus for attaching a landing gear to an aircraft wing, the landing gear having a main strut and the aircraft wing having a wing spar, the apparatus comprising:
    a trunnion support beam having:
        a base portion configured to be attached at least proximate to the wing spar at a first location,
        a trunnion support configured to pivotally support at least a portion of the landing gear main strut at a second location, the second location being longitudinally spaced apart from the first location by a first distance, wherein the landing gear main strut is pivotable relative to the trunnion support between a static retracted position and a static deployed position, the landing gear main strut exerting a resultant force against the trunnion support along a line of action when the landing gear main strut is in the static deployed position; and
        a shear center axis extending from the base portion toward the trunnion support, the line of action of the resultant force being laterally offset from the shear center axis by no more than a second distance, the ratio of the second distance divided by the first distance being equal to or less than about 0.10.

10. The apparatus of claim 9 wherein the ratio of the second distance divided by the first distance is equal to or less than about 0.07.

11. The apparatus of claim 9 wherein the ratio of the second distance divided by the first distance is equal to or less than about 0.05.

12. The apparatus of claim 9 wherein the base portion is attached at least proximate to the wing spar with at least a first fuse pin positioned at the first location.

13. The apparatus of claim 9 wherein the second location is laterally offset from the shear center axis by no more than about 2.5 inches.

14. The apparatus of claim 9 wherein the second location is laterally offset from the shear center axis by no more than about 1.0 inch.

15. An apparatus for attaching a landing gear to an aircraft wing, the landing gear having a main strut and the aircraft wing having a wing spar, the apparatus comprising:

a trunnion support beam having:
- a base portion configured to be attached at least proximate to the wing spar;
- a trunnion support spaced apart from the base portion and configured to pivotally support at least a portion of the landing gear main strut, wherein the landing gear main strut is pivotable relative to the trunnion support between a static retracted position and a static deployed position, the landing gear main strut exerting a resultant force against the trunnion support along a line of action when the landing gear main strut is in the static deployed position; and
- a shear center axis extending from the base portion toward the trunnion support, the line of action of the resultant force at least approximately intersecting the shear center axis when the landing gear main strut is in the static deployed position.

16. The apparatus of claim 15 wherein the resultant force is at least generally aligned with the landing gear main strut when the landing gear main strut is in the static deployed position.

17. The apparatus of claim 15 wherein the trunnion support is configured to receive a fuse pin.

18. The apparatus of claim 15 wherein the trunnion support is configured to retain a fuse pin in double-shear.

19. The apparatus of claim 15, further comprising at least one lateral strut attach point positioned at least proximate to the trunnion support, the lateral strut attachment point being configured to receive a lateral support strut extending from at least proximate to the wing spar.

20. The apparatus of claim 15, further comprising at least one lateral strut attach point positioned at least proximate to the trunnion support, the lateral strut attachment point being configured to receive a lateral support strut extending from at least proximate to a fuselage portion.

21. The apparatus of claim 15 wherein the base portion is configured to receive first and second fuse pins to releasably attach the trunnion support beam to the wing spar.

22. A landing gear assembly for use with an aircraft wing, the aircraft wing having a wing spar, the landing gear assembly comprising:
- a trunnion support beam having a base portion configured to be attached at least proximate to the wing spar, a trunnion support spaced apart from the base portion, and a shear center axis extending from the base portion toward the trunnion support, wherein the trunnion support is configured to be at least approximately vertically aligned with the shear center axis when the base portion is attached at least proximate to the wing spar; and
- a landing gear main strut having a forward pivot portion and an aft pivot portion, wherein the forward pivot portion is configured to be pivotally attached at least proximate to the wing spar and the aft pivot portion is configured to be pivotally attached to the trunnion support.

23. The landing gear assembly of claim 22 wherein the base portion of the trunnion support beam is configured to be attached to the wing spar outboard of the forward pivot portion of the landing gear main strut.

24. The landing gear assembly of claim 22, further comprising a lateral support strut configured to be attached to the trunnion support beam at least proximate to the trunnion support, the lateral support strut being further configured to extend from the trunnion support beam to a position at least proximate to the wing spar.

25. The landing gear assembly of claim 22 wherein the landing gear main strut is pivotable relative to the trunnion support between a static retracted position and a static deployed position, the landing gear main strut exerting a resultant force against the trunnion support along a line of action when the landing gear main strut is in the static deployed position, and wherein the line of action of the resultant force at least approximately intersects the shear center axis when the landing gear main strut is in the static deployed position.

26. An aircraft wing comprising:
- a wing spar;
- a first trunnion support fixedly attached at least proximate to the wing spar;
- a trunnion support beam having a base portion attached at least proximate to the wing spar, the trunnion support beam further having a second trunnion support spaced apart from the base portion and a shear center axis extending from the base portion toward the second trunnion support, the second trunnion support being at least approximately vertically aligned with the shear center axis; and
- a landing gear main strut having a first pivot portion and a second pivot portion, wherein the first pivot portion is pivotally attached to the first trunnion support and the second pivot portion is pivotally attached to the second trunnion support.

27. The aircraft wing of claim 26, further comprising a fuel tank positioned adjacent to the trunnion support beam.

28. The aircraft wing of claim 26, further comprising a fuel tank positioned forward of the wing spar and adjacent to the base portion of the trunnion support beam.

29. The aircraft wing of claim 26 wherein the base portion of the trunnion support beam is attached to the wing spar outboard of the first trunnion fitting.

30. The aircraft wing of claim 26 wherein the base portion of the trunnion support beam is attached to the wing spar with at least a first fuse pin configured to fail and release the trunnion support beam from the wing spar when the landing gear main strut exerts a preselected force against the second trunnion support.

31. The aircraft wing of claim 26, further comprising at least one lateral support member extending from the wing spar to a position at least proximate to the trunnion support beam.

32. A system for pivotally attaching a landing gear main strut to an aircraft wing, the aircraft wing having a wing spar, the landing gear main strut having a forward pivot portion and an aft pivot portion about which the main strut can pivot, the system comprising:
- means for pivotally supporting the forward pivot portion of the landing gear main strut at least proximate to the wing spar;
- means for pivotally supporting the aft pivot portion of the landing gear main strut at least generally aft of the wing spar, wherein the landing gear main strut is pivotable between a static retracted position and a static deployed position, the aft pivot portion exerting a resultant force along a line of action against the means for pivotally supporting the aft pivot portion when the landing gear main strut is in the static deployed position; and
- means for transferring substantially all of the resultant force from the aft pivot portion to the wing spar without transferring a torsional force from the aft pivot portion to the spar.

33. The system of claim 32 wherein the means for transferring is at least approximately vertically aligned with the means for pivotally supporting the aft pivot portion.

34. The system of claim 32 wherein the means for transferring the resultant force includes a shear center axis, and wherein the system further comprises means for aligning the line of action with the shear center axis.

35. The system of claim 32 wherein the means for transferring the resultant force is attached to the wing spar, and wherein the system further comprises means for releasing the means for transferring from the wing spar when the resultant force reaches a preselected value.

36. A method for mounting a landing gear to an aircraft wing having a wing spar, the landing gear having a main strut with a first pivot portion and a second pivot portion, the main strut being pivotable about the first and second pivot portions between a static retracted position and a static deployed position, the method comprising:

attaching a first trunnion support at least proximate to the wing spar;

attaching a base portion of a trunnion support beam at least proximate to the wing spar, the trunnion support beam further having a second trunnion support spaced apart from the base portion and a shear center axis extending from the base portion toward the second trunnion support, the second trunnion support being at least approximately vertically aligned with the shear center axis;

pivotally connecting the first pivot portion of the landing gear main strut to the first trunnion support; and pivotally connecting the second pivot portion of the landing gear main strut to the second trunnion support.

37. The method of claim 36 wherein attaching the base portion of the trunnion support beam includes attaching the base portion with at least a first breakable element, and wherein pivotally connecting the first pivot portion of the landing gear main strut includes pivotally connecting the first pivot portion with at least a second breakable element, wherein the first and second breakable elements are configured to fail and release the landing gear main strut from the wing spar when the landing gear main strut exerts a preselected force against the trunnion support beam.

38. The method of claim 36 wherein attaching the base portion of the trunnion support beam includes attaching the base portion outboard of the first trunnion support.

* * * * *